(12) United States Patent
Zaytoun, Jr.

(10) Patent No.: US 10,361,507 B2
(45) Date of Patent: Jul. 23, 2019

(54) DEVICE FOR PROTECTION OF ELECTRONIC DEVICE CHARGING CORD

(71) Applicant: Zaytoun Industries, New Bern, NC (US)

(72) Inventor: George Zaytoun, Jr., New Bern, NC (US)

(73) Assignee: ZAYTOUN INDUSTRIES, New Bern, NC (US)

( * ) Notice: Subject to any disclaimer, the term of this patent is extended or adjusted under 35 U.S.C. 154(b) by 0 days.

(21) Appl. No.: 15/992,802

(22) Filed: May 30, 2018

(65) Prior Publication Data

US 2018/0351289 A1    Dec. 6, 2018

Related U.S. Application Data

(60) Provisional application No. 62/512,763, filed on May 31, 2017.

(51) Int. Cl.
| | | |
|---|---|---|
| *H01R 13/56* | (2006.01) | |
| *H01R 13/58* | (2006.01) | |
| *H02J 7/00* | (2006.01) | |

(52) U.S. Cl.
CPC ....... *H01R 13/5804* (2013.01); *H01R 13/562* (2013.01); *H01R 13/582* (2013.01); *H02J 7/0042* (2013.01); *H01R 13/5833* (2013.01)

(58) Field of Classification Search
CPC ............ H02G 1/08; H02G 3/06; H02G 1/085; H02G 3/0608; H02G 3/08; H02G 3/081; H02G 3/26; H02G 11/006; H02G 15/076; H02G 15/14; H02G 3/00; H02G 3/0406; H02G 3/0475; H02G 3/128; H02G 3/18; H02G 3/22; H02G 9/04; H02G 11/02; H02G 15/007; H01R 33/975; H01R 13/60; H01R 31/00; H01R 31/06; H01R 13/562; H01R 13/5816; H01R 13/5845; H01R 13/72; H05K 7/12; B65H 2701/3919; B65H 75/406; B65H 75/28; B65H 75/4473; B65H 2701/534; B65H 2701/536; B65H 75/06; B65H 75/182; B65H 75/285;
(Continued)

(56) References Cited

U.S. PATENT DOCUMENTS

| | | | | |
|---|---|---|---|---|
| 4,632,488 A | * | 12/1986 | Long ...................... | H01R 13/58 439/448 |
| 5,640,476 A | * | 6/1997 | Womack .............. | G02B 6/4478 385/76 |

(Continued)

*Primary Examiner* — Edwin A. Leon
*Assistant Examiner* — Matthew T Dzierzynski
(74) *Attorney, Agent, or Firm* — NK Patent Law

(57) ABSTRACT

The presently disclosed subject matter relates to protectors that safeguard the charging cords of a wide variety of electronic devices, preventing the cords from becoming damaged during use. The protector cooperates with the electronic device charger, keeping the charging cord safely bent at a soft angle to prevent fraying, breaking, and the like. Conventional charging cords include a first end that plugs into an outlet, providing a power source, and a second end that plugs into or connects with the electronic device, thereby charging the device. The protector enables the cord to be maintained at an angle suitable to prevent or minimize damage, thereby extending the life of the charger.

19 Claims, 8 Drawing Sheets

(58) Field of Classification Search
CPC .. H04R 1/1033; G02B 6/3887; G02B 6/4478; G02B 6/3829
See application file for complete search history.

(56) References Cited

U.S. PATENT DOCUMENTS

| | | | | | |
|---|---|---|---|---|---|
| 5,886,294 | A * | 3/1999 | Scrimpshire | ......... | G02B 6/3887 174/359 |
| 6,068,506 | A * | 5/2000 | Shen | ................ | H01R 13/562 439/447 |
| 6,431,500 | B1 * | 8/2002 | Jacobs | ................ | F16L 3/13 24/129 R |
| 6,554,489 | B2 * | 4/2003 | Kent | ................ | G02B 6/3829 385/135 |
| 6,634,801 | B1 * | 10/2003 | Waldron | ............ | G02B 6/3887 385/135 |
| 6,827,601 | B1 * | 12/2004 | Haeberle | ............ | H01R 13/5841 174/135 |
| 6,938,867 | B2 * | 9/2005 | Dirks | ................ | H01R 13/72 248/309.1 |
| 6,959,139 | B2 * | 10/2005 | Erwin | ................ | G02B 6/4478 385/134 |
| 7,001,081 | B2 * | 2/2006 | Cox | ................ | G02B 6/3887 385/86 |
| 7,052,305 | B2 * | 5/2006 | Kurokawa | ........ | H01R 13/5804 439/371 |
| 7,134,902 | B1 * | 11/2006 | Lewis | ................ | H01R 13/6395 439/373 |
| 7,288,000 | B2 * | 10/2007 | Liu | ................ | H01R 13/5845 439/447 |
| 7,486,994 | B2 * | 2/2009 | Zarembo | ................ | A61N 1/056 607/116 |
| 7,490,997 | B2 * | 2/2009 | Verhagen | ............ | G02B 6/3887 385/78 |
| 7,677,812 | B2 * | 3/2010 | Castagna | ............ | G02B 6/4478 385/69 |
| 7,837,157 | B2 * | 11/2010 | Linhart | ................ | A47L 9/246 248/52 |
| 7,887,341 | B2 * | 2/2011 | Liao | ................ | H01R 13/60 439/131 |
| 7,911,757 | B2 * | 3/2011 | Hsu | ................ | H01R 13/6666 361/118 |
| 8,337,236 | B2 * | 12/2012 | Shu | ................ | H01R 13/6395 439/369 |
| 8,353,721 | B2 * | 1/2013 | Deimel | ................ | H05K 9/0018 439/607.41 |
| 8,911,246 | B2 * | 12/2014 | Carnevali | ............ | G06F 1/1632 439/170 |
| 9,331,436 | B2 * | 5/2016 | Kim | ................ | H01R 25/003 |
| 9,331,466 | B2 * | 5/2016 | Scherpenberg | ........ | H02G 11/02 |
| 9,437,963 | B1 * | 9/2016 | DeJesu | ............ | H01R 13/5812 |
| 9,602,639 | B2 * | 3/2017 | Carnevali | ............ | H04M 1/0254 |
| 9,831,603 | B2 * | 11/2017 | Balest | ................ | H01R 13/639 |
| 9,936,782 | B2 * | 4/2018 | Puopolo | ................ | A45C 13/001 |
| 9,989,187 | B2 * | 6/2018 | Siders | ................ | F16L 57/005 |
| 9,997,882 | B1 * | 6/2018 | Warren | ................ | H01R 13/60 |
| 2011/0132634 | A1 * | 6/2011 | Fetzer-Westmeister | | ................ H02G 3/14 174/66 |
| 2012/0220162 | A1 * | 8/2012 | Zhou | ................ | H01R 13/72 439/501 |
| 2012/0229967 | A1 * | 9/2012 | Zhou | ................ | H01R 13/72 361/679.01 |
| 2013/0003291 | A1 * | 1/2013 | Zhou | ................ | F16M 11/041 361/679.41 |
| 2015/0018052 | A1 * | 1/2015 | Baschnagel | ............ | H04M 1/04 455/575.1 |
| 2016/0020638 | A1 * | 1/2016 | Hemesath | ................ | H02J 7/025 320/108 |
| 2017/0029239 | A1 * | 2/2017 | Xu | ................ | B65H 75/4473 |
| 2018/0197389 | A1 * | 7/2018 | Grant | ................ | G08B 13/1409 |
| 2018/0367653 | A1 * | 12/2018 | Sweney | ................ | H04M 1/02 |

\* cited by examiner

DEVICE FOR PROTECTION OF ELECTRONIC DEVICE CHARGING CORD

CROSS REFERENCE TO RELATED APPLICATIONS

This application claims the benefit of U.S. Provisional Patent Application No. 62/512,763, filed May 31, 2017, incorporated by reference herein in its entirety.

TECHNICAL FIELD

The presently disclosed subject matter relates generally to a device for the protection of electronic device charging cords.

BACKGROUND

The use of portable electronic devices in our daily lives has grown rapidly. It is not unusual for a person to use laptop computers, tablet computers, smart phones, and the like to constantly remain in contact with business associates, friends, family, and others. Such portable electronic devices are typically powered by rechargeable batteries, resulting in a continuous need to power and/or recharge the device. While chargers are typically effective at recharging and powering the portable electric devices, repeated bending of the associated charger cords can cause fraying or other damage. This is particularly a problem when the charger cords are repeatedly bent at sharp or other damaging angles. While the electronic device chargers can be replaced after damage to the cords, frequent replacement can be expensive and time-consuming. It would therefore be beneficial to provide a protective device that can be used to safeguard portable electronic device charger cords.

SUMMARY

In some embodiments, the presently disclosed subject matter is directed to a protector for an electronic device charger having a cord and a connector that attaches to the charging port of an electronic device. Particularly, the protector comprises a body defined by a top face, bottom face, front face, rear face, left face, and right face. The protector further comprises one or more legs that extend from the bottom face of the body, wherein each leg comprises a left side face and an opposing right side face. The protector includes a first opening positioned on the top face of the body, configured for housing at least a portion of the connector, and a second opening positioned on the bottom face of the body, configured for housing a first portion of the cord. The protector further includes a first recess that connects the first opening with the second opening within an interior of the body, and a second recess that extends through an interior of the one or more legs from the left face to the right face, wherein the second recess is configured for housing a second portion of the cord. The angle between the first recess and the second recess is about 90 degrees or greater.

In some embodiments, wherein the angle is between about 90 and 180 degrees, such as about 90 degrees.

In some embodiments, the protector is constructed from rubber, plastic, metal, wood, or combinations thereof. In some embodiments, the protector is constructed from a material that can be printed upon.

In some embodiments, the protector comprises an insert housed within the first opening, the insert comprising a top face comprising an opening and an insert recess that connects with the first recess. In some embodiments, the insert is constructed from rubber, plastic metal, wood, or combinations thereof.

In some embodiments, the main body is configured in a generally rectangular shape.

In some embodiments, the one or more legs include a bottom surface comprising a non-skid element.

In some embodiments, the one or more legs include at least one face with an indented portion configured for wrapping excess cord around during storage.

In some embodiments, the presently disclosed subject matter is directed to a method of protecting the cord of an electric device charger having a cord and a connector that attaches to the charging port of the electronic device. Particularly, the method comprises threading the cord and connector through the disclosed protector. The first portion of the cord is maintained within the first recess such that the connector is at least partially housed within the first opening on the top face of the body. The second portion of the cord is maintained within the second recess. The angle between the first portion of the cord and the second portion of the cord is about 90-180 degrees.

BRIEF DESCRIPTION OF THE DRAWINGS

The previous summary and the following detailed descriptions are to be read in view of the drawings, which illustrate some (but not all) embodiments of the presently disclosed subject matter.

FIG. 1b is a perspective view of the protector of FIG. 1a.

FIG. 1c is a sectional view of the protector of FIG. 1a.

FIG. 2b is a perspective view of the protector of FIG. 2a.

FIG. 2c is a sectional view of the protector of FIG. 2a.

FIG. 6b is a sectional view of the protector of FIG. 6a.

DETAILED DESCRIPTION

Figure 1A:
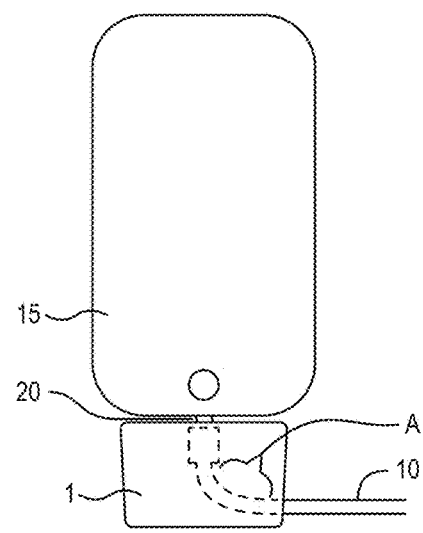
FIG. 1a is a top plan view of a protector with a charging cord and phone attached, in accordance with some embodiments of the presently disclosed subject matter.

The presently disclosed subject matter is introduced with sufficient details to provide an understanding of one or more particular embodiments of broader inventive subject matters. The descriptions expound upon and exemplify features of those embodiments without limiting the inventive subject matters to the explicitly described embodiments and features. Considerations in view of these descriptions will likely give rise to additional and similar embodiments and features without departing from the scope of the presently disclosed subject matter.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in the subject specification, including the claims. Thus, for example, reference to "a device" can include a plurality of such devices, and so forth.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments +/−20%, in some embodiments +/−10%, in some embodiments +/−5%, in some embodiments +/−1%, in some embodiments +/−0.5%, and in some embodiments +/−0.1%, from the specified amount, as such variations are appropriate in the presently disclosed subject matter.

The presently disclosed subject matter relates to protectors that safeguard the charging cords of a wide variety of electronic devices, preventing the cords from fraying and/or breaking during use. The disclosed protectors can be used with the charging cords of a wide variety of electronic devices. For example, in some embodiments, the disclosed protectors can be used with chargers for a phone (e.g., iPhone®, Android®, Google®, etc.), tablets, laptop computers, MP3 players, and the like. However, it should be appreciated that the disclosed protector is not limited and can be used with a wide variety of devices known or used in the art.

As set forth in more detail herein below, the protector cooperates with the electronic device charger, keeping the charging cord safely bent at a soft angle to prevent fraying, breaking, and the like. Conventional charging cords include a first end that plugs into an outlet (providing a power source) and a second end that plugs into or connects with the electronic device, thereby charging the device. The protector enables the cord to be maintained at an angle suitable to prevent or minimize damage, thereby extending the life of the charger.

FIG. 1a illustrates one embodiment of protector 1 adapted to receive the charging portion (connector 20) and cord 10 of an electric device charger. The protector is configured such that charging connector 20 makes contact with device 15 to charge the device. The device is further configured such that the portion of cord 10 that is adjacent to the connector is held at a desirable angle to minimize damage (i.e., breakage and/or fraying). For example, in some embodiments, angle A of the cord bend within the connector interior can be greater than 90 degrees, such as at least about (or no more than about) 90, 95, 100, 105, 110, 115, 120, 125, 130, 135, 140, 145, 150, 160, 165, 170, 175, or 180 degrees.

Figure 1B:
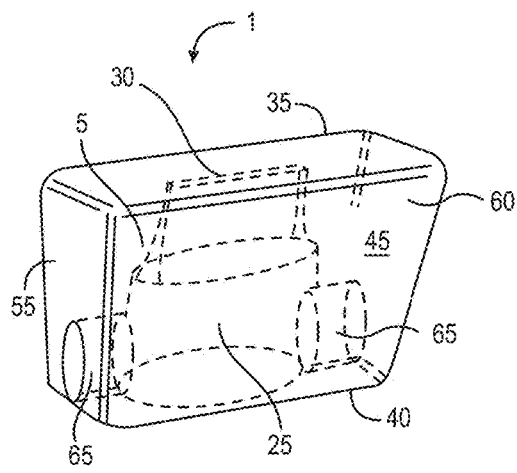

As illustrated in FIG. 1b, protector 1 includes body 5 comprising top face 35 and opposing bottom face 40, front face 45 and opposing rear face 50, and left face 55 and opposing right face 60. The terms "right face" and "left face" correspond to the right-hand and left-hand sides of the protector, respectively, when held in a user's hand and positioned for connection to an electronic device. The term "top face" designates the top surface of the disclosed protector when held in the user's hand and positioned for connection to an electronic device. Thus, top face 35 is positioned adjacent to electronic device 15 to allow the charging cord to charge the device. The term "bottom face" refers to the face opposite the top face and designates the bottom surface of the disclosed protector. The term "front face" refers to the face of the disclosed protector oriented towards the user when positioned for connection to the electronic device. The "rear face" is the face opposite the front face.

Figure 1C:
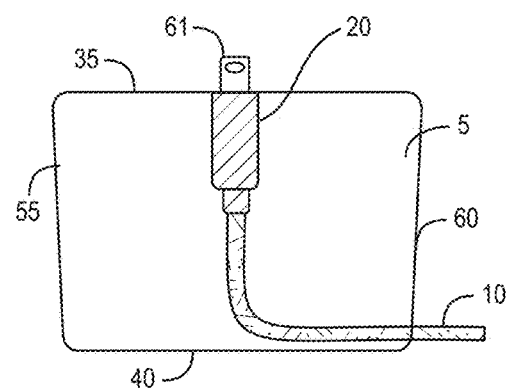

Protector 1 further comprises top opening 30 and one or more side openings 65. Specifically, the top opening is positioned on top face 35, and is sized and shaped to allow contact element 61 of connector 20 to extend therethrough, as shown in FIG. 1c. In some embodiments, at least a portion of the connector can extend through top opening 30. Side opening 65 is sized and shaped to allow cord 20 to extend therethrough. The interior of the protector comprises recess 25 that interconnects top and side openings 30, 65 to retain a portion of cord 20 therein. In this way, the charger is maintained in position during use (e.g., while charging a device), with contact element 61 extending from the top opening, and the connector and cord of the charger housed within the interior of the connector. The recess is configured to ensure that the connector and cord are maintained at a soft angle when within the interior of the protector to minimize and/or prevent damage to the cord resulting from sharp bends (i.e., fraying, breaking, and the like).

In the embodiments illustrated in FIGS. 1a-1c, recess 25 is configured to be large enough to allow the user to manipulate connector 20 and cord 10 of the charger for proper positioning. For example, the user can manipulate the connector and/or cord with the fingers or by feeding the cord into recess 25 to properly position contact element 61 within top opening 30. When it is desired to remove the charger from recess 25, the user can simply pull or apply pressure to cord 10, thereby removing the connector from the first opening. The connector and cord travel down and out of the protector through second opening 30.

Figure 2A:
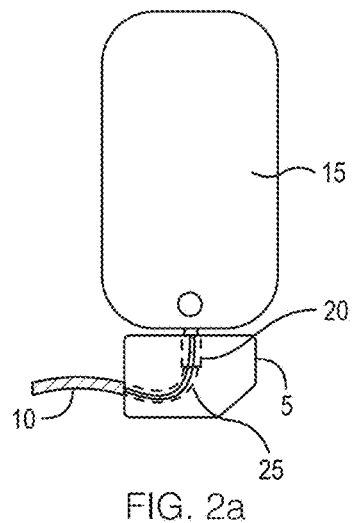
FIG. 2a is a front plan view of a protector with a charging cord and phone attached, in accordance with some embodiments of the presently disclosed subject matter.
Figure 2B:
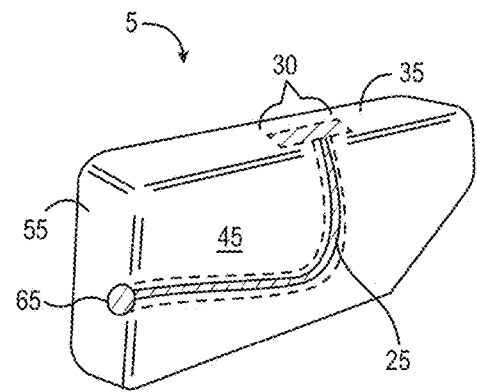
Figure 2C:
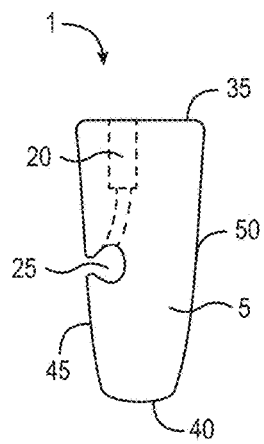
Figure 2D:
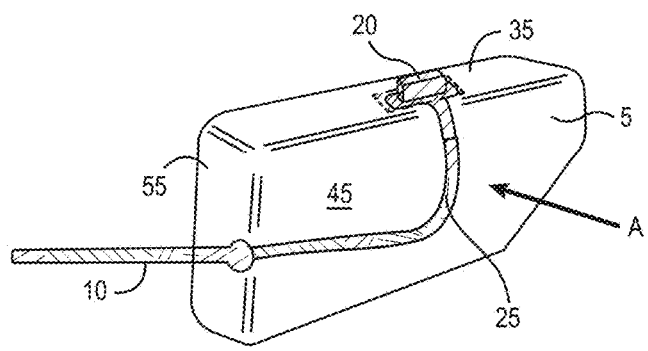
FIG. 2d is a perspective view of the protector of FIG. 2a, shown with a charging cord attached in accordance with some embodiments of the presently disclosed subject matter.

As shown in FIGS. 2a-2c, in some embodiments, at least a portion of recess 25 can be configured on front or rear face 45, 50 (i.e., on an external surface) that extends into the interior of the protector. Thus, cord 10 and connector 20 of the charger are exposed on the front or rear face of the protector. However, because recess 25 is sized and shaped to closely correspond with the charger connector and cord portions, the charger is held in place within the recess until the user desires to remove it. As shown in FIG. 2d, to attach or remove the charger (connector 20 and cord 10), a user would simply apply light pressure (Arrow A) to position the charger within recess 25. As shown in FIGS. 2b and 2d, in some embodiments one corner of protector 1 can be rounded or angled.

Figure 3A:
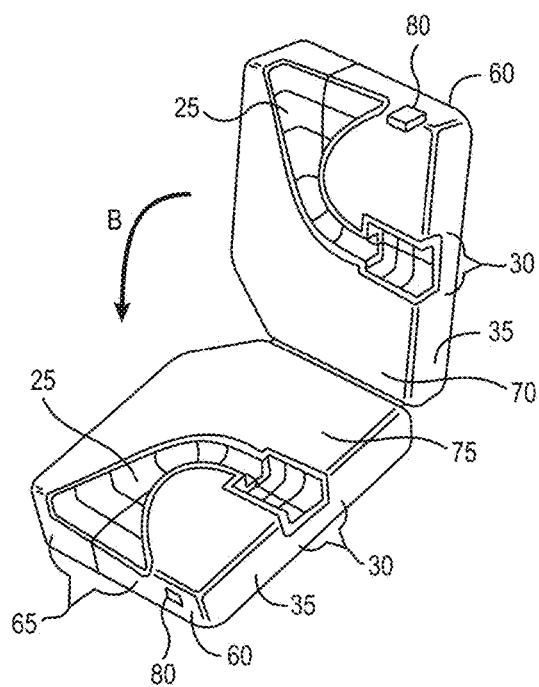
FIG. 3a is a perspective view of a protector in accordance with some embodiments of the presently disclosed subject matter.
Figure 3B:
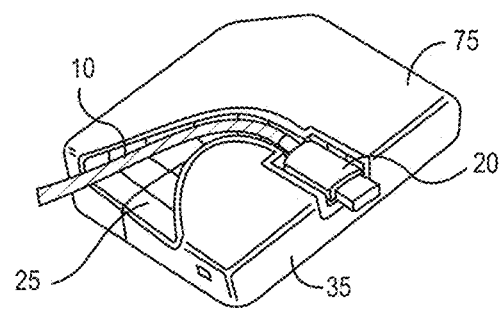
FIG. 3b is a sectional view of the protector of FIG. 3a, shown with a charging cord attached in accordance with some embodiments of the presently disclosed subject matter.

As shown in FIG. 3a, in some embodiments body 5 of the protector can be opened to expose recess 25 for positioning and removing the charger. Thus, the body can include first and second portions 70, 75 that can be joined together using fastening element 80. Fastening element 80 can include one or more resealable closures used to attach and separate the first and second body portions. For example, in some embodiments, the fastening element can include (but is not limited to) snap-fit closures, threaded closures, friction fit closures, and the like. In these embodiments, when a user desires to use protector 1, he can simply separate first and second body portions 70, 75 and position the connector and cord within the recess (i.e., connector 20 extending from top opening 30 and cord 10 extending from side opening 65), as shown in FIG. 3b. After the charger has been properly positioned within the recess of body 5, the first and second body portions can be joined together (as shown with Arrow B of FIG. 3a) and maintained in closed position using fastening element 80. When the user desires to remove the charger from the protector, he simply separates the first and second body portions to access and remove the charger.

Figure 4A:
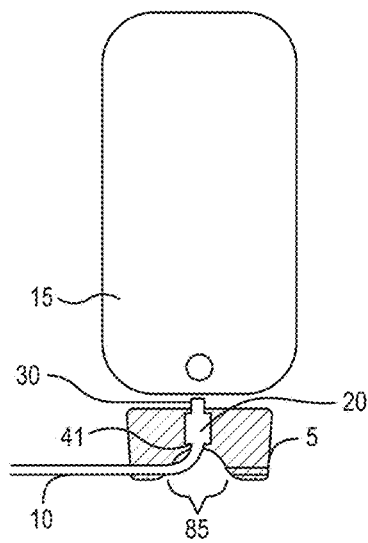
FIG. 4a is a front plan view of a protector with a charging cord and phone attached, in accordance with some embodiments of the presently disclosed subject matter.
Figure 4B:
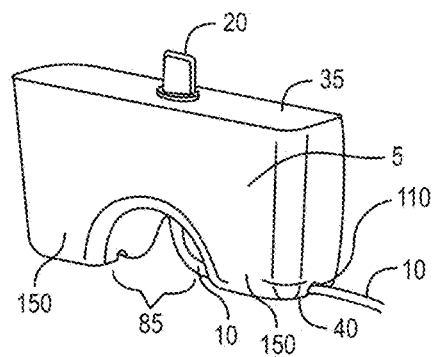
FIG. 4b is a perspective view of the protector of FIG. 4a, with a charging cord attached in accordance with some embodiments of the presently disclosed subject matter.
Figure 4C:
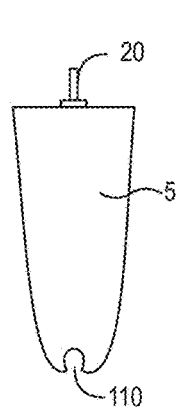
FIG. 4c is a sectional view of the protector of FIG. 4a, shown with a charging cord attached in accordance with some embodiments of the presently disclosed subject matter.
Figure 4D:
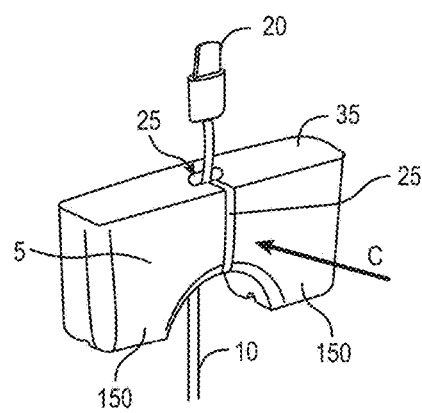
FIG. 4d is a perspective view of the protector of FIG. 4a, shown during use in accordance with some embodiments of the presently disclosed subject matter.

As shown in FIGS. 4a-4c, in some embodiments, body 5 can include one or more cutouts 85. For example, cutout 85 can be configured adjacent to the bottom edge of the protector, creating legs 150. The legs can be used to support the body and/or an associated phone or other device when connected. The cutout can be constructed in any desired shape (e.g., oval, circular, square, rectangular, triangular, semi-circular). In some embodiments, recess 25 is constructed to connect top opening 30 and aperture 41 positioned on the bottom face of the protector, adjacent to the cutout. In some embodiments, the protector can include groove 110 positioned on bottom face 40 to ensure the cord is held in proper position (i.e., at a slight angle) to avoid damage. As shown in FIG. 4d, to position the charger within recess 25, a user can simply insert the cord into the recess within the main body of the protector, as illustrated with Arrow C. The segment of cord 10 not positioned within the recess is positioned downward and can optionally be inserted into groove 110 located on the bottom face of the protector, as shown in FIG. 4b.

Figure 5A:
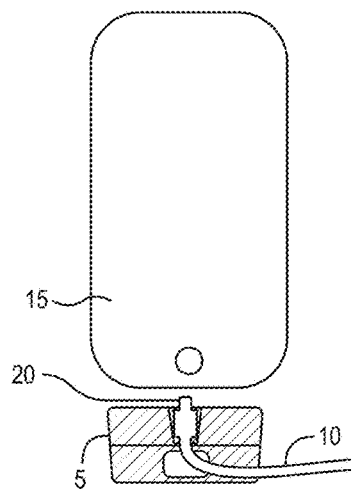
FIG. 5a is a front plan view of a protector with a charging cord and phone attached, in accordance with some embodiments of the presently disclosed subject matter.
Figure 5B:
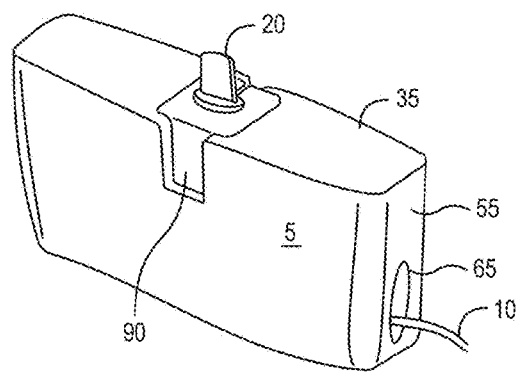
FIG. 5b is a perspective view of the protector of FIG. 5a, with a charging cord attached in accordance with some embodiments of the presently disclosed subject matter.

In some embodiments, body 5 can include insert 90 positioned within top opening 30, as shown in FIGS. 5a and 5b. The insert can function to stabilize connector 20 and/or ensure that the connector is maintained in the proper position. Insert 90 is sized and shaped to fit within first opening 30 of top face 35, which in some embodiments has been enlarged to accommodate the insert. Insert 90 comprises insert opening 95 that is sized and shaped to house connector 20 and allows the connector to charge device 15. Insert 90 further comprises insert recess 105 that is used to allow cord 10 to pass to body recess 25. Insert 90 can be constructed from a wide variety of materials known and used in the art, including (but not limited to) rubber, plastic, metal, wood, and the like.

Figure 5C:
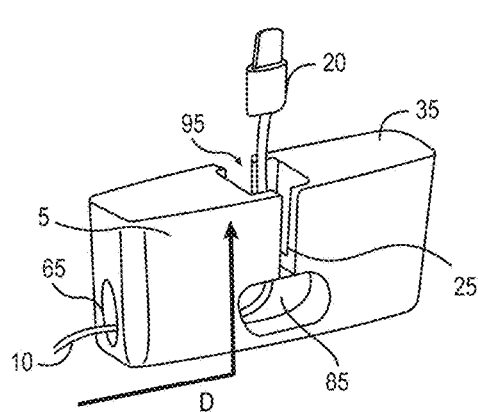
FIGS. 5c and 5d are perspective views of the protector of FIG. 5a, shown in use in accordance with some embodiments of the presently disclosed subject matter.
Figure 5D:
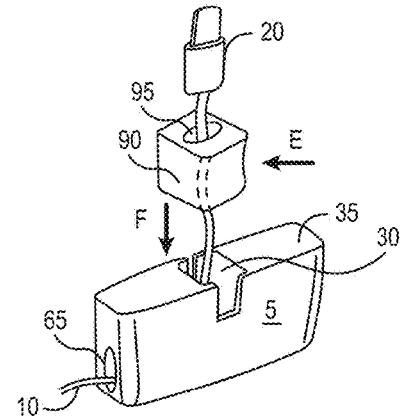

As illustrated in FIG. 5c, the user can introduce connector 20 and cord 10 of the charger to the protector by inserting through side opening 65 located on left or right faces 55, 60. The connector and cord are then maneuvered through recess 25 (which in some embodiments includes cut-out 85 to facilitate proper positioning of the charger) until connector 20 extends through top opening 30, as shown by Arrow D. The portion of cord 10 that extends through first opening 30 is then positioned within insert recess 105 and connector 20 extends through insert opening 95, as shown by Arrow E in FIG. 5d. The insert is then positioned into first opening 30 as shown by Arrow F in FIG. 5d. The resulting configuration is shown in FIG. 5b, where the insert is housed within first opening 30, the connector extends through insert opening 95, and cord 10 extends through second opening 65.

Figure 6A:
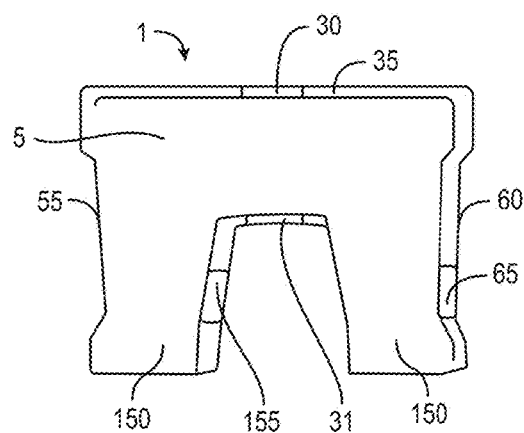
FIG. 6a is a front plan view of a protector in accordance with some embodiments of the presently disclosed subject matter.
Figure 6B:
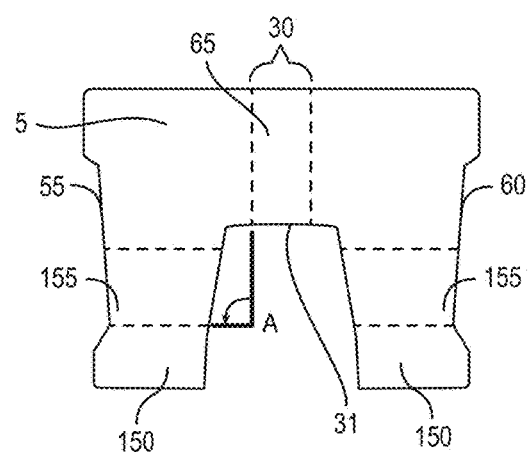

FIGS. 6a and 6b illustrate one embodiment of protector 1. Particularly, the protector can be configured to include body 5 and at least one leg 150 that extends from bottom face 40 of the body. Body 5 comprises top opening 30 and bottom opening 31 positioned on bottom face 40. First recess 65 extends from top opening 30 to bottom opening 31 within the interior of the body. In some embodiments, recess 65 can be at least partially exposed, such as the embodiment of FIG. 2d. The first recess is sized and shaped to house a first portion of cord 10 (e.g., the portion directly adjacent to connector 20). The protector further includes second recess 155 that spans the width of leg 150, connecting one side of the leg with the opposing side, as shown in FIG. 6b. The second recess is sized and shaped to house a second portion of cord 10. The angle between the first and second recesses is about 90-180 degrees to ensure that the cord maintains a soft angle (i.e., at least about or no more than about 90, 95, 100, 105, 110, 115, 120, 125, 130, 135, 140, 145, 150, 155, 160, 165, 170, 175, or 180 degrees).

Figure 6C:
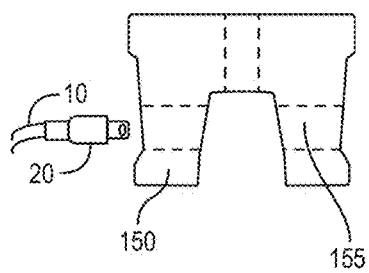
FIGS. 6c-6e are front plan views of the protector of FIG. 6a during use in accordance with some embodiments of the presently disclosed subject matter.
Figure 6D:
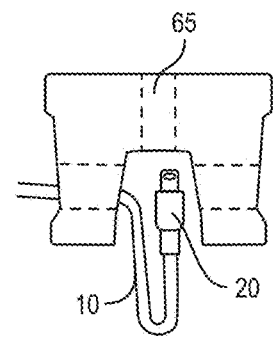
Figure 6E:
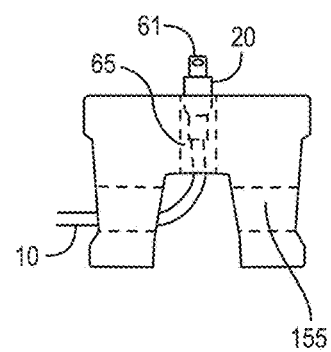
Figure 6F:
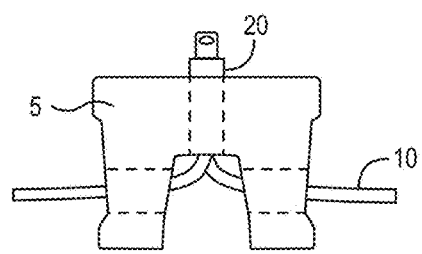
FIG. 6f is an embodiment of the protector of FIG. 6a during use in accordance with some embodiments of the presently disclosed subject matter.

In use, the user simply inserts connector 20 and cord 10 through second recess 155 of one leg 150, as shown in FIG. 6c. The connector and cord pass through the second recess and are manipulated to then pass through first recess 65, as shown in FIG. 6d. The connector is thereby positioned to attach to the charging port of a device, such as a phone, as illustrated in FIG. 6e. Because the charging connector extends from the top face of the protector, it is easier to connect and disconnect the charger from the device compared to devices that lack the disclosed protector. In some embodiments, a charging cord can pass through more than one recess 155, as shown in the embodiment of FIG. 6f.

Figure 7:
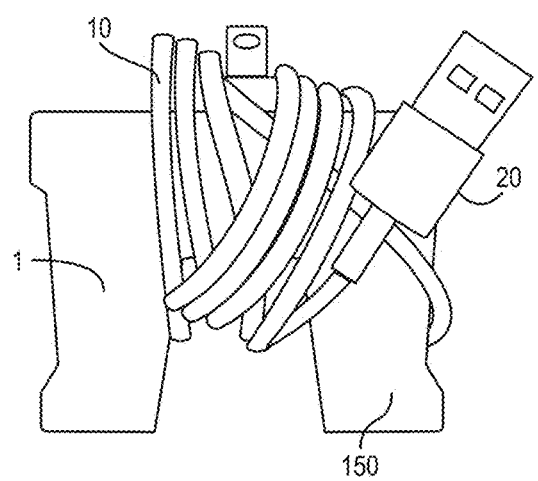
FIG. 7 is a front plan view of the protector of FIG. 6a during storage in accordance with some embodiments of the presently disclosed subject matter.

Due to the shape of body 5 and/or legs 150, the protector can be easily used to wrap excess cord during storage. For example, as shown in FIG. 7, excess cord 10 can be wound between the cut-out and the top face of the protector and/or between the cut-out and leg 150. For example, the legs can include indentations to facilitate easy wrapping of the cord. In this way, the protector and the charging device can be kept together. In addition, the protector prevents the charging cord from being misplaced or sliding off furniture when not in use.

The shape of the protector further allows a user to prop a device (e.g., phone) upright while charging. In this way, the device is easily operational during the charging process. Advantageously, the shape also prevents cord 10 from bending and/or breaking. The design further allows the user to more easily plug and unplug the device for charging, since the charging portion extends through the connector.

In some embodiments, protector 1 can be formed in a generally rectangular shape. However, the shape of the protector is not limited and can be configured in any desired shape known or used in the art, including (but not limited to) square, circular, oval, triangular, elliptical, diamond, star, rainbow, abstract, cloverleaf, and combinations thereof. In some embodiments, bottom face 40 can be flat to allow the protector to rest on a flat surface, such as a table. In some embodiments, at least one corner or edge of the protector can be angled or rounded, as shown in FIGS. 2a-2d. In some embodiments, the lower portions of the legs can be widened and/or elongated to provide a more stable surface when positioned upright.

Protector 1 can be constructed from any of a wide variety of materials known or used in the art. For example, in some embodiments, the protector can be constructed from a soft and/or pliable material, such as (but not limited to) rubber, plastic, and the like. In other embodiments, the protector can be formed from rigid or semi-rigid materials, such as hard plastic, metal, wood, and the like. It should also be appreciated that combinations of some materials can be used. In some embodiments, the material used to construct the protector can be selected to allow printing on one or more surface, such as with the manufacturer, a trademark, directional arrows for use, and the like.

In some embodiments, the protector can be used to support device 15 and facilitate charging. Particularly, the protector bottom face can rest on a level surface, such as a table, during charging to provide stability and support to the electronic device. In some embodiments, bottom face 40 can comprise a non-slip material to prevent the protector from sliding or moving. In addition, the protector advantageously allows the user to prop the device up while charging, instead of only lying in a flat orientation. Further, because the cord passes through the protector during charging, it is protected from breaking and/or bending.

While the presently disclosed subject matter has been described in connection with what is presently considered to be the most practical and preferred embodiments, it is to be understood that the invention is not to be limited to the disclosed embodiments but is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A protective device for supporting a charging cable, the protective device comprising:
   a main body defining a recess extending generally vertically therethrough, the recess extending into an opening through which an end of the charging cable extends through for being received within a port of a mobile device;
   a pair of spaced-apart legs extending from a bottom facing surface of the main body, wherein at least one leg of the pair of spaced-apart legs defines a recess extending generally horizontally through a width of the leg, wherein a portion of the charging cable extends through the recess,
   wherein, in operation, the end of the charging cable is inserted into the generally horizontal recess of the at least one leg and then extended into the generally vertical recess of the main body before being received within the port of the mobile device,
   wherein an opening is defined between the pair of spaced-apart legs, the opening providing visual access to the charging cable and providing physical access to the charging cable in order to extend the charging cable from the recess defined within the at least one of the spaced-apart legs into the recess defined within the main body.

2. The protective device of claim 1, wherein the protective device is constructed from rubber, plastic, metal, wood, or combinations thereof.

3. The protective device of claim 1, wherein the protective device is constructed from a material that can be printed upon.

4. The protective device of claim 1, further comprising an insert enclosed within the recess that is defined within the body.

5. The protective device of claim 1, wherein the main body is configured in a generally rectangular shape.

6. The protective device of claim 1, wherein the spaced-apart legs include a bottom surface comprising a non-skid element.

7. The protective device of claim 1, wherein the one or more legs include at least one face with an indented portion configured for wrapping excess cord around during storage.

8. A protective device for supporting a charging cable, the protective device comprising:
   a main body defining a recess extending generally vertically therethrough, the recess extending into an opening through which an end of the charging cable extends through for being received within a port of a mobile device;
   a pair of spaced-apart legs extending from a bottom facing surface of the main body, wherein at least one leg of the pair of spaced-apart legs defines a recess extending generally horizontally through a width of the leg, wherein a portion of the charging cable extends through the recess,
   wherein, in operation, the end of the charging cable is inserted into the generally horizontal recess of the at least one leg and then extended into the generally vertical recess of the main body before being received within the port of the mobile device,
   wherein an opening is defined between the pair of spaced-apart legs, the opening providing visual access to the charging cable and providing physical access to the charging cable in order to extend the charging cable from the recess defined within the at least one of the spaced-apart legs into the recess defined within the main body,
   wherein the one or more legs include at least one face with an indented portion configured for wrapping excess cord around during storage.

9. The protective device of claim 8, wherein the protective device is constructed from rubber, plastic, metal, wood, or combinations thereof.

10. The protective device of claim 8, wherein the protective device is constructed from a material that can be printed upon.

11. The protective device of claim 8, further comprising an insert enclosed within the recess that is defined within the body.

12. The protective device of claim 8, wherein the main body is configured in a generally rectangular shape.

13. The protective device of claim 8, wherein the spaced-apart legs include a bottom surface comprising a non-skid element.

14. An assembly comprising:
- a mobile electronic device having a charging port;
- a protective device for supporting a charging cable, the protective device comprising:
  - a main body defining a recess extending generally vertically therethrough, the recess extending into an opening through which an end of the charging cable extends through for being received within the port of the mobile device;
  - a pair of spaced-apart legs extending from a bottom facing surface of the main body, wherein at least one leg of the pair of spaced-apart legs defines a recess extending generally horizontally through a width of the leg, wherein a portion of the charging cable extends through the recess,
  - wherein, in operation, the end of the charging cable is inserted into the generally horizontal recess of the at least one leg and then extended into the generally vertical recess of the main body before being received within the port of the mobile device,
  - wherein an opening is defined between the pair of spaced-apart legs, the opening providing visual access to the charging cable and providing physical access to the charging cable in order to extend the charging cable from the recess defined within the at least one of the spaced-apart legs into the recess defined within the main body,
  - wherein the one or more legs include at least one face with an indented portion configured for wrapping excess cord around during storage.

15. The assembly of claim 14, wherein the protective device is constructed from rubber, plastic, metal, wood, or combinations thereof.

16. The assembly of claim 14, wherein the protective device is constructed from a material that can be printed upon.

17. The assembly of claim 14, further comprising an insert enclosed within the recess that is defined within the body.

18. The assembly of claim 14, wherein the main body is configured in a generally rectangular shape.

19. The assembly of claim 14, wherein the spaced-apart legs include a bottom surface comprising a non-skid element.

* * * * *